United States Patent
Ho et al.

(10) Patent No.: US 7,352,707 B2
(45) Date of Patent: Apr. 1, 2008

(54) PROCESSING METHOD ENABLING EACH UNIT IN STACKING NETWORK DEVICE TO RUN RAPID SPANNING TREE PROTOCOL

(75) Inventors: Ho Chien Ho, Hsinchu (TW); Jiun Bing Luo, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 1065 days.

(21) Appl. No.: 10/445,900

(22) Filed: May 28, 2003

(65) Prior Publication Data
US 2004/0240398 A1 Dec. 2, 2004

(51) Int. Cl.
*H04L 12/28* (2006.01)

(52) U.S. Cl. .............. 370/256; 370/401; 370/389; 370/408

(58) Field of Classification Search ........... 370/256, 370/408
See application file for complete search history.

(56) References Cited

U.S. PATENT DOCUMENTS

| | | | |
|---|---|---|---|
| 6,188,694 B1 * | 2/2001 | Fine et al. | 370/402 |
| 6,262,977 B1 * | 7/2001 | Seaman et al. | 370/256 |
| 6,304,575 B1 * | 10/2001 | Carroll et al. | 370/408 |
| 6,496,502 B1 * | 12/2002 | Fite et al. | 370/389 |
| 7,139,267 B2 * | 11/2006 | Lu et al. | 370/386 |
| 7,177,946 B1 * | 2/2007 | Kaluve et al. | 709/242 |
| 2001/0021177 A1 * | 9/2001 | Ishii | 370/256 |
| 2002/0052936 A1 * | 5/2002 | Gai et al. | 709/220 |
| 2002/0159398 A1 * | 10/2002 | Yamada et al. | 370/256 |
| 2003/0065814 A1 * | 4/2003 | Ishii | 709/239 |
| 2006/0233186 A1 * | 10/2006 | Portolani et al. | 370/408 |

OTHER PUBLICATIONS

Chapter 17 of IEEE Std. 802.1w-2001, IEEE Standards for Local and metropolitan area networks—Common specifications Part 3: Media Access Control (MAC) Bridges-Amendmet 2: Rapid Reconfiguration, Jul. 9, 2001.*

* cited by examiner

*Primary Examiner*—Wing Chan
*Assistant Examiner*—Robert C. Scheibel
(74) *Attorney, Agent, or Firm*—Bacon & Thomas, PLLC

(57) ABSTRACT

The present invention is to provide a processing method enabling each unit in a stacking network device to utilize the functions and the Port Role Selection procedure updtRoles-Bridge( ) provided by the RSTP to rapidly select the port having the best priority from the stacking network device for executing STP and the relating algorithm in order to effectively reduce the working burden of the master unit through uniformly distributing the work to the slave units, which not only greatly increase the network transmission efficiency of the stacking network system, but also greatly improve the quality and speed of the network information transmission.

9 Claims, 3 Drawing Sheets

PROCESSING METHOD ENABLING EACH UNIT IN STACKING NETWORK DEVICE TO RUN RAPID SPANNING TREE PROTOCOL

BACKGROUND OF THE INVENTION

1. Field of the Invention

The present invention relates to a processing method enabling each unit in a stacking network device to run Rapid Spanning Tree Protocol, more particularly to a processing method applied to a stacking network system to effectively reduce the working burden of the master unit through uniformly distributing the work of executing the Spanning Tree Protocol (hereinafter abbreviated as STP) and the relating algorithm to the slave units according to the Rapid Spanning Tree Protocol (hereinafter abbreviated as RSTP).

2. Description of the Related Art

In the recent years, due to the prosperous development in the network world, a variety of the network devices have been developed and been widely used in our living and working environments. The trend of network development not only increases the speed and efficiency of information transaction, but also brings lots of conveniences to our daily lives and works. Within the variety of network systems, the Stacking or Chassis Layer 2/Layer 3 Switch seems to be the most favorite to the market, and becomes a main stream in the future development of the network devices and is widely seen in the market nowadays. Many of these switches implement Spanning Tree Protocol to build an active topology and to provide an alternative path that may have been introduced to improve reliability in LAN.

There are many methods to implement Spanning Tree Protocol in stacking network devices. One of the method, maybe the simplest way, is to run Spanning Tree Protocol and the relating algorithm in one unit, usually the smallest unit number (i.e. unit 1), this unit is called "master unit". Other units are called "slave unit". This naming of the unit is proprietary and of course could be different in various kinds of switches. All operations of the Spanning Tree Protocol, such like recording the received BPDU information, calculation of Spanning Tree priority vectors and Spanning Tree timer values etc, are only done by master unit. The workload of master unit is linearly increased with the number of device ports. This not only greatly lower down the network transmission efficiency of the stacking network system, but also cause bad influences to the quality and speed of the network information transmission.

SUMMARY OF THE INVENTION

With respect to the bad influences to the quality and speed of the network information transmission in the above mentioned conventional stacking network system due to the heavy workload of master unit, the inventor then invents a processing method enabling each unit in a stacking network device to run Rapid Spanning Tree Protocol and effectively reducing the working burden of the master unit through uniformly distributing the work of executing STP and the relating algorithm to the slave units according to RSTP, which not only greatly increase the network transmission efficiency of the stacking network system, but also greatly improve the quality and speed of the network information transmission.

The primary objective of the present invention is to provide a processing method enabling each unit in a stacking network device to make any necessary changes in order to have the ability of rapid reconfiguration while running the Rapid Spanning Tree Protocol.

The another objective of the present invention is to provide a processing method by utilizing the functions provided by the Rapid Spanning Tree Protocol and cooperating with the Port Role Selection procedure updtRolesBridge( ) to rapidly select the port having the best priority from the stacking network device for executing Spanning Tree Protocol and the relating algorithm.

The still another objective of the present invention is to provide a method enabling per Bridge Variables in each unit of a stacking network device to have the same value while proceeding with the process according to the Rapid Spanning Tree Protocol. Any action to change one of the variables must be synchronized. If a BPDU is to be transmitted on a stack link port, the two byte Protocol Identifier of BPDU field takes the value of BridgePortID in the port priority vector. Upon receiving the BPDU internally between each unit, BridgePortID for message priority vector is extracted from Protocol Identifier field, it does not need to check the Protocol Identifier, Protocol version Identifier and BPDU type.

The still another objective of the present invention is that, while a port is enabled, the value for Designated Priority vector for a stack port is copied the same exactly from Root Priority vector. Exceptional is when this bridge is a Root Bridge (i.e. rootPortID has the zero value), the value of BridgePortID is filled with the stack portID. This will prevent from letting stack port in each unit become a Designated Port and cause unnecessary exchange information all the time. Only the smallest stack portID will become a Designated Port, and the port roles of other stack port are Root Port.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENTS

Figure 1:
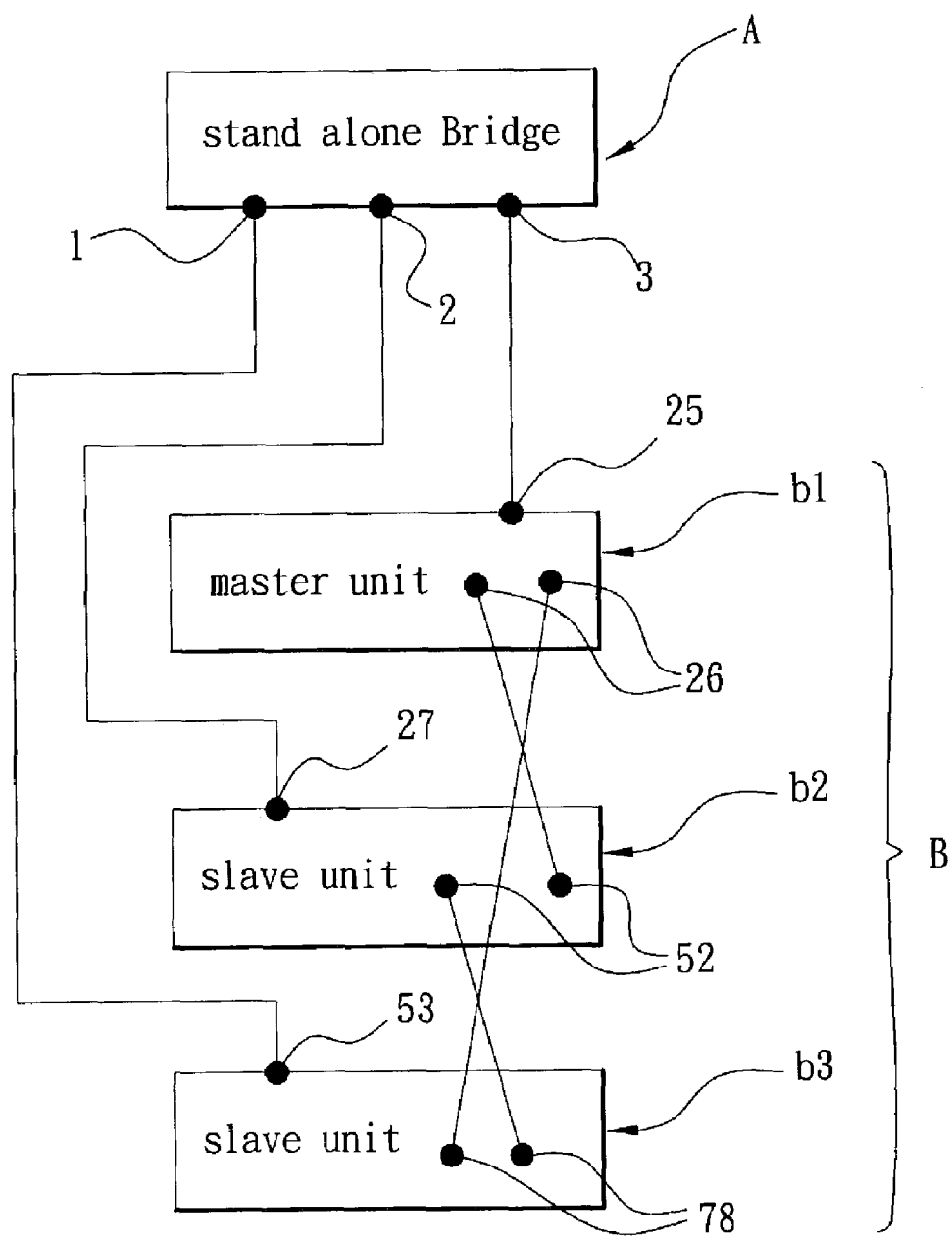
FIG. 1 is a perspective diagram of a network device of a preferred embodiment according to the present invention.

In general, the Rapid Spanning Tree Protocol (IEEE802.1W) mentioned in the present invention is an amendment to IEEE802.1D and IEEE802.1t defines the changes necessary to the operation of Spanning Tree Protocol to provide rapid reconfiguration capability. Conventionally, Spanning Tree priority vector is the information sent by RSTP bridges to each other, in Configuration Messages or BPDUs, to assign port role for each port in the bridge. Each Spanning Tree priority vector comprises the following components:

1) Bridge Identifier of the Root Bridge (hereinafter abbreviated as RootBridgeID);
2) Root Path Cost for the transmitting Bridge (hereinafter abbreviated as RootPathCost);
3) Bridge Identifier of the transmitting Bridge (hereinafter abbreviated as DesignatedBridgeID);
4) Port Identifier of the Port through which the message was transmitted (hereinafter abbreviated as DesignatedPortID);
5) Port Identifier of the Port through which the message was received (hereinafter abbreviated as BridgePortID).

Within the Spanning Tree priority vectors, there is a port priority vector defined for the port when the reception of BPDUs and any pending update of information has been completed:

port priority vector={RootBridgeID:RootPathCost:
DesignatedBridgeID:DesignatedPortID:Bridge-
PortID}

Within the spanning tree priority vectors, there is a message priority vector conveyed in a received Configuration Message. For example, when a Bridge B receiving a Configuration Message on a Port PB from a Designated Port PD on a Bridge D claiming a Root identifier of RD and a Root Path Cost of RPCD, the message priority vector in the Bridge B is:

message priority vector={RD:RPCD:D:PD:PB}

Within the spanning tree priority vectors, a root path priority vector for the port can be calculated from a received port priority vector, by adding the receiving Port's path cost PPCPB to the Root Path Cost component, and including the receiving Port's Port ID as the final component. At this moment, the root path priority vector in the Bridge B is:

root path priority vector={RD:RPCD+PPCPB:D:
PD:PB}

A bridge priority vector for the Bridge B is the priority vector that would be used to transmit to other bridges if it was selected as the Root Bridge:

bridge priority vector={B:0:B:0:0}

The root priority vector for the Bridge B is the best priority vector after calculation with its received priority vector from the Bridge D:

root priority vector={B:0:B:0:0}, if B is better than
RD;or={RD:RPCD+PPCPB:D:PD:PB}, if B is
worse than RD A designated priority vector for a port Q on the Bridge B is the root priority vector with the Bridge B. s Bridge Identifier B substituted for the DesignatedBridgeID and the port Q's Port Identifier QB substituted for the DesignatedPortID and BridgePortID components:

designated priority vector={B:0:B:QB:QB}, if B is
better than RD;

or

={RD:RPCD+PPCPB:B:QB:QB}, if B is worse than
RD

If the designated priority vector is better than the port priority vector, the port will be the Designated Port for the attached LAN and the port priority vector will be updated. The message priority vector in RST BPDUs transmitted by a port always comprises the first four components of the port priority vector of the port, even if the port is a Root Port.

In stacking network devices, the values of Bridge variables are kept to be same in all units. All slave units must have the same BridgeID(BridgePriority+MAC address) with the master unit because they have to be looked as one bridge. The same situation also happens on BridgeTimes (Forward Delay, Hello Time, Max Age, Message age), rootPortID, rootPriority and rootTimes, therefore any action to change one of the variables must be synchronized.

In the stacking network device, the receive and transmit of BPDUs follow the procedures or state machine as stated in the IEEE802.1W, only a little bit modification is done on the stack port (the port which link to other units). While transmitting BPDU is required on a stack port, the two byte Protocol Identifier of BPDU field takes the value of BridgePortID in the port priority vector. Upon receiving the BPDU internally between each unit, BridgePortID for message priority vector is extracted from Protocol Identifier field, it does not need to check the Protocol Identifier, Protocol version Identifier and BPDU type.

Another modification is at updtRolesBridge( ) procedure, which will be discuss deeply at below. For all other Rapid Spanning Tree state machines remain the same as described in IEEE802.1W.

The present invention utilizes the functions provided by the above mentioned Rapid Spanning Tree Protocol to cooperate with the processing method thereof, which enables the work of executing STP and the relating algorithm originally done by the master unit to be uniformly distributed to the slave units:

In a preferred embodiment of the present invention, a network system with an active topology is used as referring to FIG. 1, wherein the network system comprises a stand alone device Bridge A and a stacking network device Bridge B with three units b1, b2 and b3. In this embodiment, the Bridge A and each unit of the Bridge B can be a bridge respectively. However, it is understood that the present invention is not limited to this, anyone skilled in the art intended to replace the bridges by using other network devices should also be deemed as included within the scope claimed in the present invention.

In the preferred embodiment, the Bridge A is a stand alone device and the Bridge B is a stacking network device including three units b1, b2 and b3, in which the Bridge A has a better BridgeID priority than the Bridge B and is a Root Bridge. In the preferred embodiment, assuming that all ports have the same PortPathCost "10", a port 1 of the Bridge A connects to a port 53 of the Bridge B (i.e. the first port of the slave unit b3), a port 2 of the Bridge A connects to a port 27 of the Bridge B (i.e. the first port of the slave unit b2), and a port 3 of the Bridge A connects to a port 25 of the Bridge B (i.e. the 25th port of the master unit b1). The port 53 of the slave unit b3 is a root port in a state of forwarding information. Ports 26, 52 and 78 of the master unit b1, slave units b2 and b3 are designated ports in a state of forwarding information and connect with each other to form a single stacking network device. The ports 25 and 27 are alternate ports in a discarding state. As regards the ports 1, 2 and 3 of the Bridge A are designated ports in a state of forwarding information As the Bridges start up, the Bridge A and Bridge B will start to calculate Spanning Tree priority vectors, assuming that the Bridge A and B have not been connected yet, they will be a root bridge for themselves and the result of Spanning Tree priority vector calculation is shown in the following table:

| Spanning Tree Priority vector | Bridge A | Bridge B |
| --- | --- | --- |
| Root Priority vector | {A: 0: A: 0: 0} | {B: 0: B: 0: 0} |
| Designated Priority for Port 1 | {A: 0: A: 1: 1} | {B: 0: B: 1: 1} |
| Designated Priority for Port 2 | {A: 0: A: 2: 2} | {B: 0: B: 2: 2} |
| Designated Priority for Port Q | {A: 0: A: Q: Q} | {B: 0: B: Q: Q} |
| Designated Priority for stack Port Y | -N/A- | {B: 0: B: 0: Y} |

The value of Port Priority vector is taken from Designated Priority vector when the port is enabled. In distributed RSTP implementation, the value for Designated Priority vector for stack port is copied the same exactly from Root Priority vector. Exceptional is when this bridge is a Root Bridge (i.e. rootPortID has the zero value), the value of BridgePortID is filled with the stack portID. This will prevent from letting stack port in each unit become a Designated Port and cause unnecessary exchange information all the time. Only the smallest stack portID will become a Designated Port, and other stack port's port role are Root Port.

The purpose of putting Root Priority vector in stack port's Designated Priority is to allow stack port to transmit the best priority in its unit to all other units for further comparison and calculation. The value of Designated Priority vector will be assigned to Port Priority vector and port role for stack port in each unit is Designated Port at the beginning. Then this stack port transmits broadcastly to all units controlled by the Port Transmit state machine. The receiving BPDU is handled by Port Information state machine. Finally, Root Priority vector {B:0:B:0:26} is selected as the best Root Priority vector among all units. The value of Designated Priority vector for all ports remain the same as previous. The port 26 is a Designated Port, the port 52 and port 78 are Root Ports and receive Repeat information from the port 26 every hello time period.

In the preferred embodiment, while the Bridge A and Bridge B have been properly connected, the port 25 of the Bridge B receives Superior Message from the port 3 of the Bridge A and replaces its Port Priority vector with {A:0:A:3:25} and recalculates the port role. The port 25 of the Bridge B becomes Root Port. For the stack port 26, it still has not received any BPDU yet and been selected as Designated Port. Since its Port Priority vector is not the same as Designated Priority vector, updtInfo is set True to update its Port Priority vector as shown below:

| Spanning Tree Priority vector | Bridge B |
| --- | --- |
| Root Priority vector | {A: 10: A: 3: 25} |
| Designated Priority for Port 1 | {A: 10: B: 1: 1} |
| Designated Priority for Port 2 | {A: 10: B: 2: 2} |
| Designated Priority for Port Q | {A: 10: B: Q: Q} |
| Designated Priority for stack Port 26 | {A: 10: A: 3: 25} |
| Port Priority for stack Port 26 | {A: 10: A: 3: 25} |
| Port Priority for receiving Port 25 from Bridge A | {A: 0: A: 3: 25} |

When the port 27 of the Bridge B receives Superior Message from the port 2 of the Bridge A and replaces its Port Priority vector with {A:0:A:2:27} and recalculates the port role. The port 27 of the Bridge B becomes Root Port. For the stack port 52, it still has not received any BPDU yet and been selected as Designated Port. Since its Port Priority vector is not the same as Designated Priority vector, updtInfo is set True to update its Port Priority vector as shown below:

| Spanning Tree Priority vector | Bridge B |
| --- | --- |
| Root Priority vector | {A: 10: A: 2: 27} |
| Designated Priority for Port 1 | {A: 10: B: 1: 1} |
| Designated Priority for Port 2 | {A: 10: B: 2: 2} |
| Designated Priority for Port Q | {A: 10: B: Q: Q} |
| Designated Priority for stack Port 52 | {A: 10: A: 2: 27} |
| Port Priority for stack Port 52 | {A: 10: A: 2: 27} |
| Port Priority for receiving Port 27 from Bridge A | {A: 0: A: 2: 27} |

When the port 53 of the Bridge B receives Superior Message from the port 1 of the Bridge A and replaces its Port Priority vector with {A:0:A:1:53} and recalculates the port role. The port 53 of the Bridge B becomes Root Port. For the stack port 78, it still has not received any BPDU yet and been selected as Designated Port. Since its Port Priority vector is not the same as Designated Priority vector, updtInfo is set True to update its Port Priority vector as shown below:

| Spanning Tree Priority vector | Bridge B |
| --- | --- |
| Root Priority vector | {A: 10: A: 1: 53} |
| Designated Priority for Port 1 | {A: 10: B: 1: 1} |
| Designated Priority for Port 2 | {A: 10: B: 2: 2} |
| Designated Priority for Port Q | {A: 10: B: Q: Q} |
| Designated Priority for stack Port 78 | {A: 10: A: 1: 53} |
| Port Priority for stack Port 78 | {A: 10: A: 1: 53} |
| Port Priority for receiving Port 53 from Bridge A | {A: 0: A: 1: 53} |

In the preferred embodiment, when each unit of the Bridge B starts to exchange information with each other, the stack port in each unit will transmit broadcastly the priority vector to all other units. The slave unit b3 does not recalculate the port role because it does not receive superior message from the master unit b1 and slave unit b2. The master unit b1 and slave unit b2 will receive the Message Priority vector {A:10:A:1:53} as the superior message and recalculate the port role. As the result, The master unit b1 and slave unit b2 accept {A:10:A:1:53} as the best Root Priority vector among all units and replace its ordinary Root Priority vector {A:10:A:3:25} and {A:10:A:2:27} respectively. At this moment, the port 25 and port 27, which receive BPDU from the Bridge A (infoIs=mine), become Alternate Ports. The Priority vector of the units b1, b2 and b3 in the Bridge A are shown below:

| Bridge B | Unit 1 | Unit 2 | Unit 3 |
| --- | --- | --- | --- |
| Root Priority vector | {A: 10: A: 1: 53} | {A: 10: A: 1: 53} | {A: 10: A: 1: 53} |
| Port Priority vector for port (infoIs = Received) | {A: 0: A: 3: 25} | {A: 0: A: 2: 27} | {A: 0: A: 1: 53} |

-continued

| Bridge B | Unit 1 | Unit 2 | Unit 3 |
|---|---|---|---|
| Designated Priority vector for port (infoIs = mine) | {A: 10: B: 25: 25} | {A: 10: B: 27: 27} | {A: 10: B: 53: 53} |
| Port Priority vector for stack port | {A: 10: A: 1: 53} | {A: 10: A: 1: 53} | {A: 10: A: 1: 53} |
| Designated Priority vector for stack port | {A: 10: A: 3: 25} | {A: 10: A: 2: 27} | {A: 10: A: 1: 53} |

Figure 2:
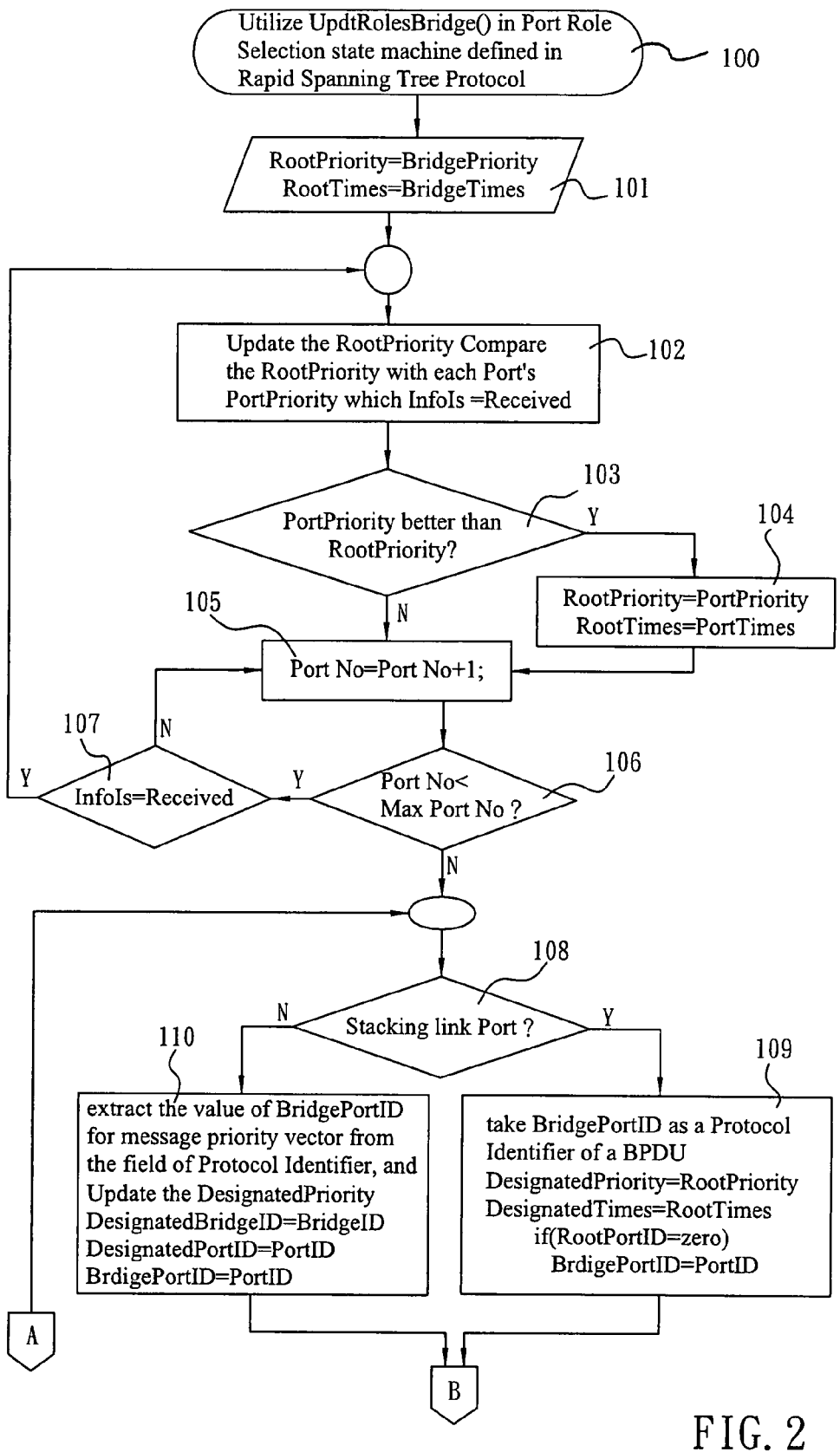
FIG. 2 is a flow chart of the processing steps of each unit in the Bridge B shown in FIG. 1 while utilizing the updtRolesBridge( ) procedure in the Port Role Selection state machine defined by the Rapid Spanning Tree Protocol (i.e. IEEE 802.1W) to calculate the port having the best root priority in the Bridge B.
Figure 3:
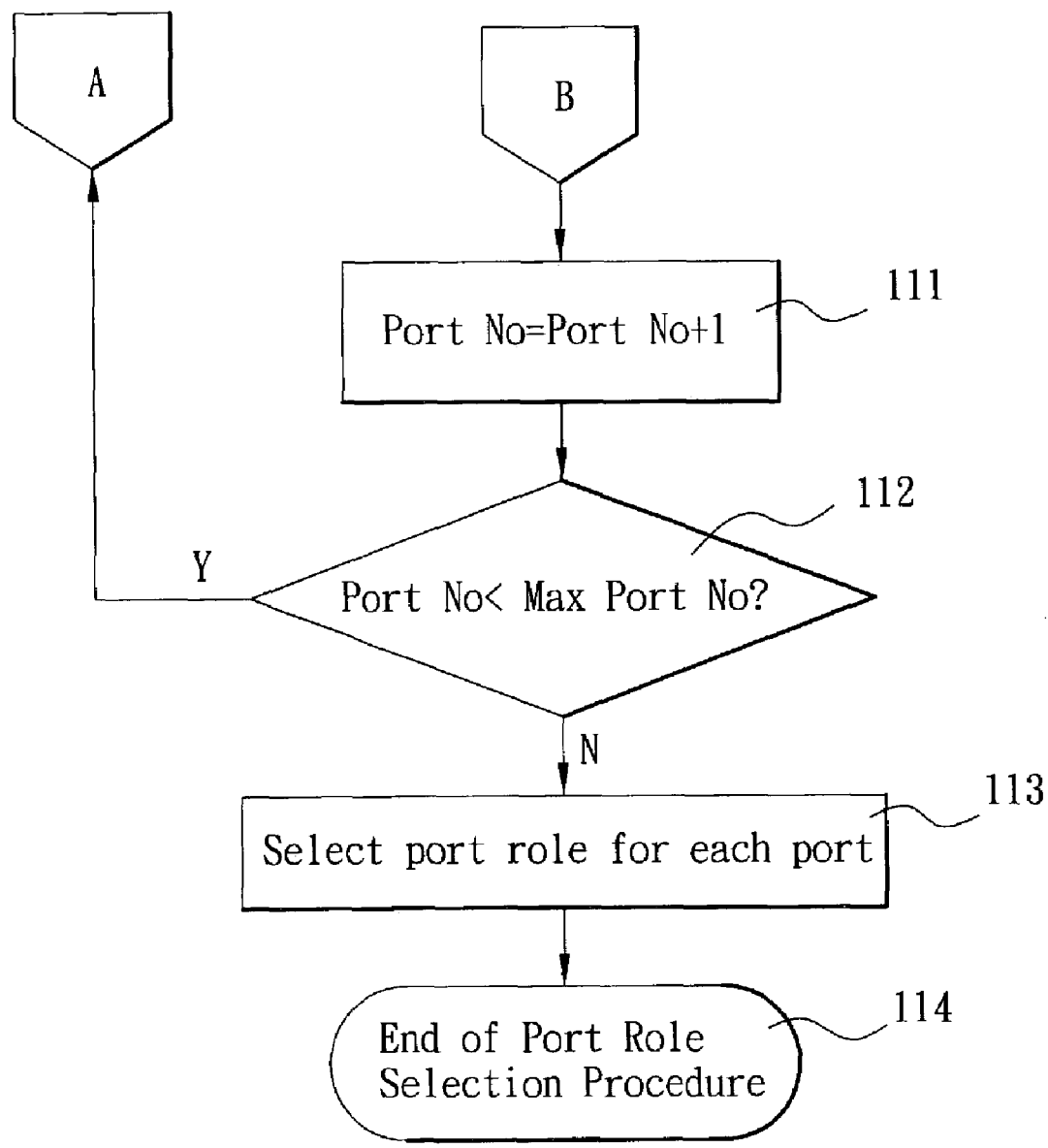
FIG. 3 is a flow chart subsequent to the flow chart shown in FIG. 2.

In the aforesaid embodiment, since most of the control procedures are following the relating regulations stipulated in the Rapid Spanning Tree Protocol (i.e. IEEE 802.1W), the present invention hereby won't make further explanations thereto, but only describe the parts relating to the characteristics of the present invention as follows:

The present invention mainly utilizes the UpdtRolesBridge( ) procedure (100) in the Port Role Selection state machine defined in Rapid Spanning Tree Protocol (i.e. IEEE 802.1W) to enable each unit in the bridge B to proceed with the following steps, referring to FIGS. 2 and 3, for calculating the port having the best root priority in the Bridge B. The procedure (100) includes the following steps:

(101) First, referring to FIG. 2, replacing the values within the fields of RootPriority and RootTimes in each unit by the values in the fields of BridgePriority and BridgeTimes respectively;

(102) comparing the value in the field of RootPriority in each unit with the value in the field of PortPriority in every port for receiving information, and updating the value in the field of PortPriority accordingly;

(103) determining whether there is a value in the field of PortPriority is better than others; if yes, proceeding with the step (104), otherwise, continuing to the step (105);

(104) replacing the values within the fields of RootPriority and RootTimes in each unit by the values in the fields of PortPriority and PortTimes respectively;

(105) increasing the port number to the next port;

(106) determining whether the port number is smaller than the largest port number; if yes, proceeding with the step (107), otherwise, continuing to the step (108);

(107) determining whether the port of the port number has received information; if yes, proceeding with the step (102), otherwise, continuing to the step (105);

(108) determining whether the port is a stacking link port; if yes, proceeding with the step (109), otherwise, continuing to the step (110);

(109) taking BridgePortID as a Protocol Identifier of a BPDU, replacing the values within the fields of DesignatedPriority and DesignatedTimes in each unit by the values in the fields of RootPriority and RootTimes respectively if BridgePortID is equal to PortlID (i.e. RootPortID is equal to zero), and then proceeding with the step (111);

(110) extracting the value of BridgePortID for the message priority vector from the file of Protocol Identifier, updating DesignatedPriority, and replacing the values within the fields of DesignatedBridgeIID, DesignatedPortIID and BridgePortID in each unit by the values in the fields of BridgeID, PortID and PortID respectively;

(111) referring to FIG. 3, increasing the port number to the next port;

(112) determining whether the port number is smaller than the largest port number; if yes, proceeding with the step (108), otherwise, continuing to the step (113);

(113) selecting the port role for every port;

(114) ending the port role selection procedure.

In view of the above, it is apparent that the present invention utilizing the Rapid Spanning Tree Protocol to cooperate with the process method thereof through the port role selection procedure UpdtRolesBridge( ) is able to rapidly select the port having the best root priority for executing the Spanning Tree Protocol and the relating algorithm. Thus, those works have to be done by the master unit in the conventional stacking network system will be uniformly distributed to the slave units. It not only greatly increase the network transmission efficiency of the stacking network system, but also greatly improve the quality and speed of the network information transmission.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A processing method enabling each unit in a stacking network device to run Rapid Spanning Tree Protocol (RSTP), which is applied to a stacking network device and enables the stacking network device to utilize a Port Role Selection procedure updtRolesBridge( ) in a Port Role Selection state machine defined in the Rapid Spanning Tree Protocol to rapidly select a port having the best priority from a plurality of ports in the stacking network device for executing Spanning Tree Protocol and the relating algorithm, including the steps of:

enabling per Bridge Variables in each unit of the stacking network device to have the same value while proceeding with the process according to the Rapid Spanning Tree Protocol, and enabling any change of one of the variables to be synchronized;

taking the value of BridgePortID in the port priority vector as the value in the field of a Protocol Identifier of a Bridge Protocol Data Unit (BPDU) while the BPDU is transmitted on a stack link port, and extracting the value of BridgePortID for message priority vector from the field of Protocol Identifier while receiving the BPDU internally between each unit;

while implementing RSTP distribution, taking the value of Root Priority vector as the value for Designated Priority vector for a stack port.

2. The processing method as claimed in claim 1, wherein when the unit is a Root Bridge, i.e. rootPortID has the zero value, further including the steps of:

filling the value in the field of BridgePortID with the stack portID, and allowing only the smallest stack portID to be a Designated Port and other stack ports to be Root Ports.

3. The processing method as claimed in claim 1, wherein when the updtRolesBridge( ) procedure is enabled, each unit in of the stacking network device proceeds with the following steps for calculating the port having the best root priority in the stacking network device:

first, replacing the values within the fields of RootPriority and RootTimes in each unit by the values in the fields of BridgePriority and BridgeTimes respectively;

comparing the value in the field of RootPriority in each unit with the value in the field of PortPriority in every port for receiving information, and updating the value in the field of PortPriority accordingly;

determining whether there is a value in the field of PortPriority better than others;

if there isn't a value in the field of PortPriority better than others, increasing the port number to the next port;

determining whether the port number is smaller than the largest port number;

if the port number is smaller than the largest port number and the port of the port number has received information, then repeating the previous steps to compare the value in the field of RootPriority in each unit with the value in the field of PortPriority in every port for receiving information and update the value in the field of PortPriority accordingly; and determining whether there is a value in the field of PortPriority better than others.

4. The processing method as claimed in claim 3, wherein if there is a value in the field of PortPriority better than others, further including the steps of:

replacing the values within the fields of RootPriority and RootTimes in each unit by the values in the fields of PortPriority and PortTimes respectively; and increasing the port number to the next port and determining whether the port number is smaller than the largest port number.

5. The processing method as claimed in claim 3, wherein if the port number is smaller than the largest port number and the port of the port number hasn't received information, further including the steps of:

repeating the previous steps to increase the port number to the next port and determine whether the port number is smaller than the largest port number.

6. The processing method as claimed in claim 3, wherein if the port number is larger than the largest port number, further including the steps of:

determining whether the port is a stacking link port;

if yes and BridgePortID is equal to PortID, i.e. RootPortID is equal to zero, then replacing the values within the fields of DesignatedPriority and DesignatedTimes in each unit by the values in the fields of RootPriority and RootTimes respectively;

increasing the port number to the next port.

7. The processing method as claimed in claim 6, wherein if the port isn't a stacking link port, further including the steps of:

updating DesignatedPriority, and replacing the values within the fields of DesignatedBridgeID, DesignatedPortID and BridgePortID in each unit by the values in the fields of BridgeID, PortID and PortID respectively;

increasing the port number to the next port.

8. The processing method as claimed in claim 7, wherein further including the steps of:

determining whether the port number is smaller than the largest port number;

if the port number is larger than the largest port number, selecting the port role for every port.

9. The processing method as claimed in claim 8, wherein if the port number is smaller than the largest port number, further including the steps of:

proceeding with the previous steps to determine whether the port is a stacking link and the steps of port role selection procedure.

* * * * *